(12) United States Patent
Lund

(10) Patent No.: US 8,689,304 B2
(45) Date of Patent: Apr. 1, 2014

(54) MULTIPLE INDEPENDENT AUTHENTICATIONS FOR ENHANCED SECURITY

(75) Inventor: Arnaud Lund, Cagnes-sur-mer (FR)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/098,588

(22) Filed: May 2, 2011

(65) Prior Publication Data

US 2012/0278870 A1 Nov. 1, 2012

(30) Foreign Application Priority Data

Apr. 27, 2011 (EP) ..................................... 11305491

(51) Int. Cl.
*H04L 29/06* (2006.01)
(52) U.S. Cl.
USPC ................ 726/7; 726/2; 726/3; 726/4; 726/5; 726/6; 726/26; 726/27; 726/28
(58) Field of Classification Search
USPC .......................... 726/7, 2, 3, 4, 5, 6, 26, 27, 28
See application file for complete search history.

(56) References Cited

U.S. PATENT DOCUMENTS

| | | | |
|---|---|---|---|
| 7,225,464 B2 | 5/2007 | Satyavolu et al. | |
| 7,305,470 B2 | 12/2007 | Tom et al. | |
| 7,500,262 B1 | 3/2009 | Sanin et al. | |
| 7,516,483 B2 | 4/2009 | Brennan | |
| 2002/0059531 A1* | 5/2002 | Lai On ........................ | 713/202 |
| 2002/0067832 A1* | 6/2002 | Jablon ........................... | 380/277 |
| 2002/0133719 A1* | 9/2002 | Westerdal ..................... | 713/201 |
| 2002/0178355 A1* | 11/2002 | D'Sa et al. ................... | 713/156 |
| 2002/0184509 A1* | 12/2002 | Scheidt et al. ................ | 713/185 |
| 2003/0042301 A1* | 3/2003 | Rajasekaran et al. ......... | 235/380 |
| 2003/0163739 A1* | 8/2003 | Armington et al. ........... | 713/202 |
| 2003/0200466 A1* | 10/2003 | Nelson et al. ................. | 713/202 |
| 2004/0187018 A1* | 9/2004 | Owen et al. ................... | 713/200 |
| 2004/0243838 A1* | 12/2004 | Buch et al. .................... | 713/201 |
| 2005/0010777 A1* | 1/2005 | Gantman et al. ............... | 713/176 |
| 2005/0091422 A1* | 4/2005 | Minogue et al. ................. | 710/8 |
| 2005/0114701 A1* | 5/2005 | Atkins et al. .................. | 713/201 |
| 2005/0149730 A1* | 7/2005 | Aissi et al. .................... | 713/168 |
| 2005/0154924 A1* | 7/2005 | Scheidt et al. ................ | 713/202 |
| 2005/0222963 A1* | 10/2005 | Johnson .......................... | 705/67 |
| 2006/0150256 A1* | 7/2006 | Fanton et al. ................... | 726/27 |
| 2007/0136799 A1* | 6/2007 | Brennan ............................ | 726/9 |
| 2008/0271117 A1 | 10/2008 | Hamilton et al. | |
| 2009/0094688 A1 | 4/2009 | Roy | |

* cited by examiner

*Primary Examiner* — Bradley Holder
(74) *Attorney, Agent, or Firm* — Schmeiser, Olsen & Watts; John Pivnichny

(57) ABSTRACT

A system and associated method for providing enhanced site access security by use of multiple authentications from independent sources. A security enhanced user service system has components of a user authentication process, a service application, a multi-authentication module and an authentication database. A user attempting to use the service application accesses through a client system that is coupled to the security enhanced user service system. The user authentication process receives login information from the user, checks for validity, and sends to the multi-authentication module to further verify the login information. The multi-authentication module generates a grant or denial by use of predefined logical condition to satisfy for the grant response, data stored in the authentication database, another security enhanced user service system etc., pursuant to a specific configuration.

16 Claims, 8 Drawing Sheets

MULTIPLE INDEPENDENT AUTHENTICATIONS FOR ENHANCED SECURITY

BACKGROUND OF THE INVENTION

The present invention discloses a system and associated method for improving site access security by using multiple authentications from independent sources. Conventional authentication mechanism uses login credentials having a user identifier and an associated password. Simple login credentials are vulnerable to a security breach. Some industry such as financial institutes, which provide remote access to their websites for services, requires higher security in accessing a website due to increased demand in remote accesses.

BRIEF SUMMARY

According to one embodiment of the present invention, a method for providing enhanced site access security by use of multiple authentications from independent sources comprises: receiving, by a user authentication process running in a server, login information from a user accessing a service application from a client system, wherein a security enhanced user service system comprises the user authentication process, the service application, a multi-authentication module and an authentication database, the security enhanced user service system coupled to the client system; determining that the received login information is valid; sending a multi-authentication data to the multi-authentication module, wherein the multi-authentication data is selected from a first group consisting of a connection data to a central multi-authentication (CM) module, an authentication query to the CM module, and an authentication request to a first local multi-authentication (LM) module; receiving a response responsive to said sending, wherein the response is selected from a second group consisting of a grant response and a denial response in accordance with content of the authentication database, wherein the grant response permits the user to access the service application from the client system, and wherein the denial response prohibits the user from accessing the service application from the client system; and communicating the received response to the user of the client system.

According to one embodiment of the present invention, a computer program product comprises a computer readable memory unit that embodies a computer readable program code. The computer readable program code contains instructions that, when run by a processor of a computer system, implement a method for providing enhanced site access security by use of multiple authentications from independent sources.

According to one embodiment of the present invention, a computer system comprises a processor, a memory coupled to the processor, and a computer readable storage device coupled to the processor, said storage device containing program code configured to be executed by the processor via the memory to implement a method for providing enhanced site access security by use of multiple authentications from independent sources.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for providing enhanced site access security by use of multiple authentications from independent sources.

DETAILED DESCRIPTION

Figure 1:
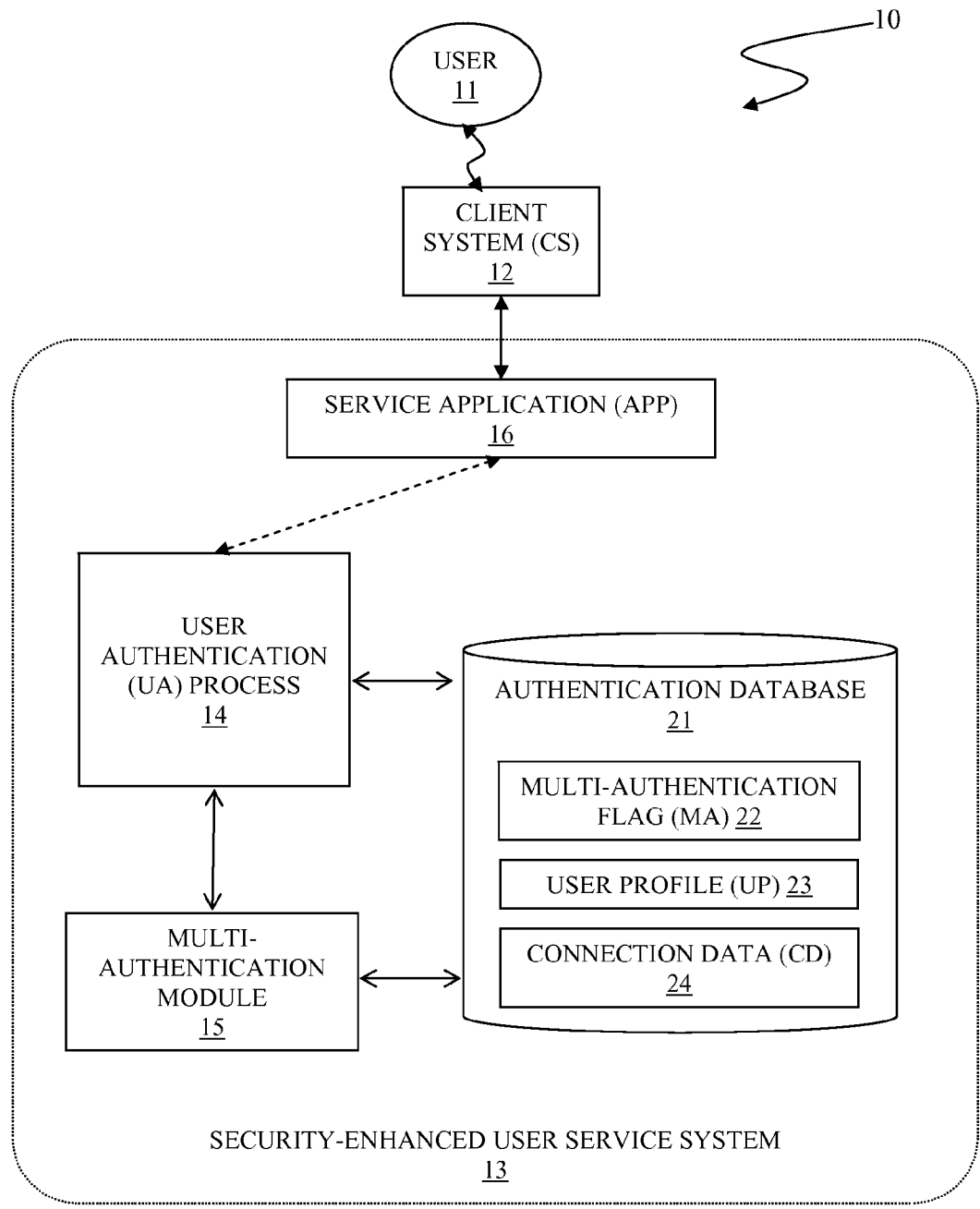
FIG. 1 illustrates a system for multiple authentications from independent sources to improve site access security, in accordance with embodiments of the present invention.

FIG. 1 illustrates a system 10 for multiple authentications from independent sources to improve site access security, in accordance with embodiments of the present invention.

The system 10 comprises a user 11, a client system 12, and a security-enhanced user service system 13. The user 11 is a human user accessing a service application 16 of the security-enhanced user service system 13 by use of the client system 12, which is a generic computer system running an interface program for the service application 16. Examples of the security-enhanced user service system 13 may be, inter alia, a web server, an intranet, etc.

The security-enhanced user service system 13 comprises a user authentication (UA) process 14, a multi-authentication module 15, the service application 16, and an authentication database 21. Examples of the service application 16 may be, inter alia, MSN®, LinkedIn, Facebook, Amazon.com®, online banking service, etc. (MSN is a registered trademark of Microsoft Inc., in the United States and/or other countries; LinkedIn is a trademark of LinkedIn Corporation in the United States and/or other countries; Facebook is a trademark of Facebook.com in the United States and/or other countries; and Amazon.com is a registered trademark of Amazon.com Inc., in the United States and/or other countries) In this specification, the term "web server" and "server" represent a software and hardware platform supporting the service application 16.

The UA process 14 authenticates the user 11 for access to the service application 16 by use of information stored in the authentication database 21. In this specification, the user 11 is presumed to be previously registered with the security-enhanced user service system 13 and the registration information is stored in the authentication database 21. See FIGS. 2A and 2B, infra, for respective configurations for two embodiments of the UA process 14.

The multi-authentication module 15 enables multiple independent authentication capability for the security-enhanced user service system 13 when the user 11 accesses the service application 16. When the service application 16 is configured for multiple independent authentication, or simply multi-authentication, to take extra security measures in granting the user 11 access to the service application 16, the UA process 14 invokes the multi-authentication module 15. The multi-authentication module 15 performs multi-authentication of the user 11 by user of data stored in the authentication database 21. See FIGS. 2A and 2B, infra, for respective configurations for two embodiments of the multi-authentication module 15. Examples of sensitive information that the service application 16 may require extra security measures may be, inter alia, financial information, medical information, police record, etc.

The authentication database 21 comprises a multi-authentication flag 22, a user profile 23, and connection data 24, which is used in authenticating the user 11 for accessing the service application 16. See FIGS. 2A and 2B, infra, for respective configurations for two embodiments of the authentication database 21.

The multi-authentication flag 22 is a configuration parameter that represents whether or not the UA process 14 invokes the multi-authentication module 15. The multi-authentication flag 22 holds a binary value selected from {TRUE, FALSE}, wherein a "TRUE" multi-authentication flag 22 indicates that a multi-authentication capability is available in authenticating the user 11 for access to the service application 16, and wherein a "FALSE" multi-authentication flag 22 indicates that the multi-authentication capability is either not available or not required in authenticating the user 11 for access to the service application 16. Accordingly, the UA process 14 invokes the multi-authentication module 15 only when the multi-authentication flag 23 is "TRUE". The value of the multi-authentication flag 22 may be predefined according to security requirements of the service application 16. In one embodiment of the present invention, the multi-authentication flag 23 is initialized with "TRUE" and stored in the user profile 23.

The user profile 23 for the user 11 is defined as data necessary to authenticate the user 11 which is stored in the authentication database 21 upon registration. The user profile 23 comprises (UP_App, UP_UserId, UP_Condition), wherein a value of UP_App identifies the service application 16 with which the user 11 had registered with, wherein a value of UP_UserId identifies the user 11 in accessing the UP_App service application 16, and wherein a value of UP_Condition represents a logical formula that the UP_UserId user 11 needs to satisfy to access the UP_App service application 16. Each instance of the user profile is uniquely identified by a key (UP_App, UP_UserId). The logical formula UP_Condition is predefined as a set of login requirements for a specific service application. Upon attempting by the user UP_UserId to log in to the specific web service provided by UP_App application, the logical formula UP_Condition is evaluated by calculating a result of a logical formula required for multi-authentication. Examples of the logical formula required for authentication may be, inter alia, Grant if (LoggedOn amazon.com) AND NOT (LoggedOn Facebook.com OR LoggedOn MSN.com)), Grant if (NOT LoggedOn MSN.com)), etc. The logical formula may include, inter alia, a password, case sensitivity of the password, case sensitivity of the user identifier, personal identification questions and corresponding answers, connection status to other predefined websites, etc., and combinations thereof.

The connection data 24 of the authentication database 21 represents status information how the user 11 is connected to the service application 16, which comprises a quadruplet (C_ClientAddr, C_App, C_UserId, C_Status), wherein a value of C_ClientAddr indicates a unique address/identifier of the client system 12, wherein a value of C_App indicates the service application 16, wherein a value of C_UserId uniquely identifies the user 11, and wherein a value of C_Status represents whether or not the user 11 is currently signed in with the service application 16. The connection data 24 is maintained up to date by cooperation of the UA process 14 and the multi-authentication module 15. In one embodiment of the present invention, the UA process 14 automatically reports updated values of the connection data 24 whenever the user 11 signs in and out of the service application 16. In another embodiment of the present invention, the multi-authentication module 15 inquires current values of the connection data 24 from the UA process 14 when the multi-authentication module 15 needs the connection data 24 to be up to date. Synchronizing connection data 24 may employ any other conventional database synchronization mechanisms. In this specification, the connection data 24 may be synchronized in a push mode or in a pull mode, which are independently applicable to two embodiments of FIGS. 2A and 2B, infra. See descriptions of step 230 of FIG. 4, infra, and step 430 of FIG. 6, infra, for details on two modes for synchronizing the connection data 24.

In one embodiment of the present invention, the system 10 is an online banking system which requires a user to log in a user network prior to grant access to an online banking application. In this embodiment, the online banking application may authenticate the user by the multi-authentication with the registration information for the user network and the account information for the online banking application. In another embodiment, the online banking website further requires the user to sign out from a mailing service website and sign in to the user network prior to grant access to the online banking application.

Figure 2A:
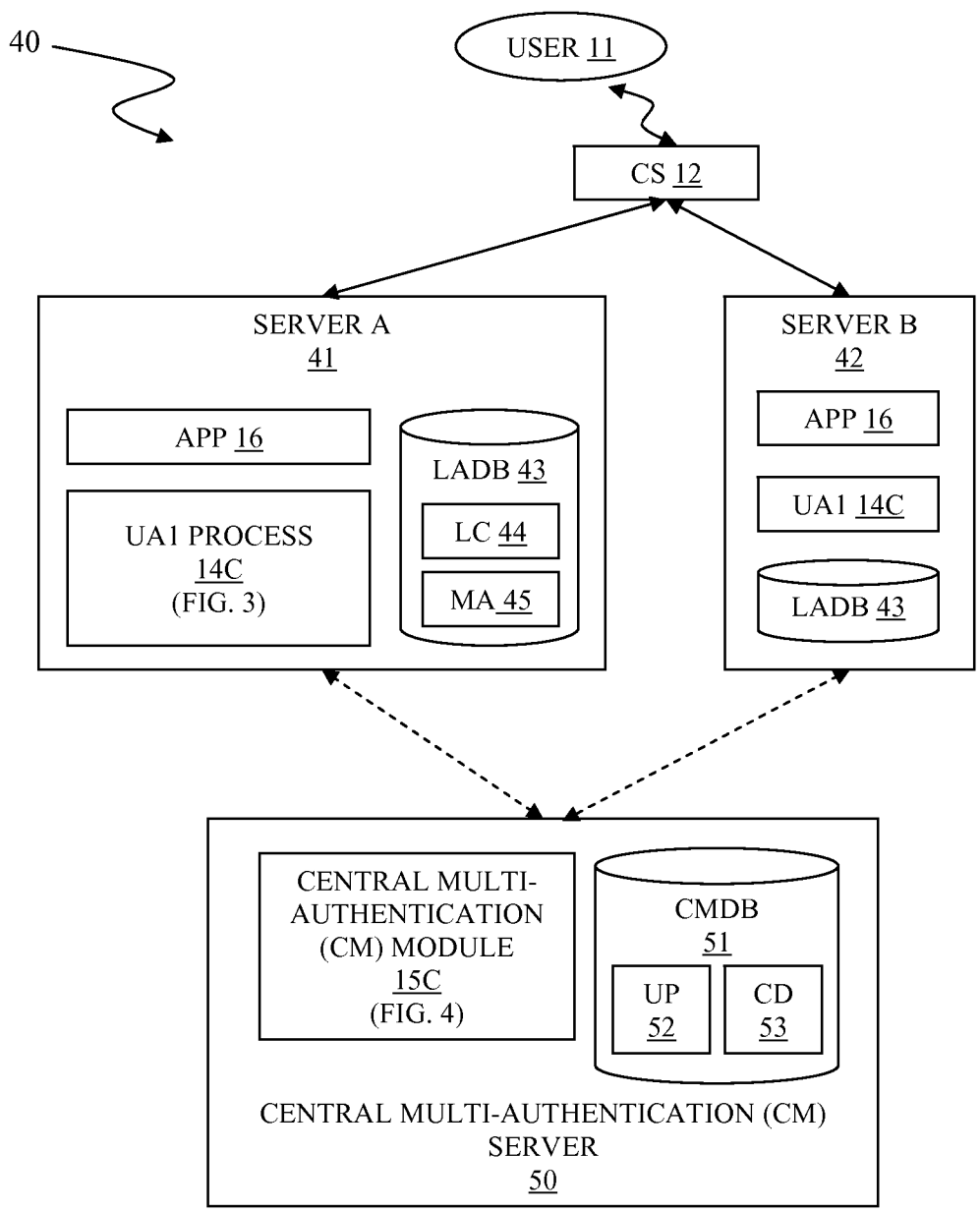
FIG. 2A illustrates a centralized system for multiple authentications from independent sources to improve site access security, in accordance with a first embodiment of the present invention.

FIG. 2A illustrates a centralized system 40 for multiple authentications from independent sources to improve site access security, in accordance with a first embodiment of the present invention.

The centralized system 40 is the first embodiment of the system 10 of FIG. 1 supra, which embodies the multiple authentications capability in a separate and centralized server referred to as a central multi-authentication (CM) server 50 for all servers in the centralized system 40, which have conventional user authentication capabilities. The centralized system 40 comprises the user 11, the client system 12, at least two servers, and the central multi-authentication (CM) server 50.

The centralized system 40 enables conventional servers to utilize multi-authentication capability without modifying conventional authentication mechanism. A third party operating the CM server 50 may provide multi-authentication services for a fee.

A server A 41 and a server B 42 of said at least two servers comprise a service application 16, a respective user authentication (UA1) process 14C and a respective local authentication database (LADB) 43. The server A 41 and the server B 42 are functionally identical in practicing the first embodiment of the present invention. In this specification, the respective user authentication process of the servers that invokes the CM server 50 is referred to as a "UA1 process" in contrast to the user authentication (UA2) processes in the second embodiment of FIG. 2B, infra.

The UA1 process 14C performs conventional user authentication for the server A 41 by use of data stored in the LADB 43 and invokes the CM server 50 for multi-authentication of the user 11 pursuant to a value of a multi-authentication flag 45 of the LADB 43. See description of FIG. 3 infra for steps performed by the UA1 process 14C. See description of the multi-authentication flag 22 of FIG. 1 supra for details of the multi-authentication flag 45.

The local authentication database (LADB) 43 comprises login credentials (LC) 44 of the server A 41 and the multi-authentication flag 45. The login credentials 44 comprises a tuple (LC_UserId, LC_Password), wherein a value of LC_UserId uniquely identifies the user 11 in accessing the service application 16 provided by the server A 41, and wherein a value of LC_Password represents a password corresponding to the user 11 identified by LC_UserId such that the user 11 accesses the service application 16 only if the user 11 of LC_UserId provides the password of LC_Password.

The central multi-authentication (CM) server 50 comprises a central multi-authentication (CM) module 15C and a central multi-authentication (CM) database (CMDB) 51.

The CM module 15C provides multi-authentication capability for the UA1 process 14C of the server A 41 by use of data stored in the CMDB 51. See description of FIG. 4 infra for steps performed by the CM module 15C.

The CMDB 51 comprises a user profile 52 and connection data 53. The user profile 52 and the connection data 53 are functionally identical to the user profile 23 and the connection data 24 of FIG. 1 supra, respectively.

Figure 2B:
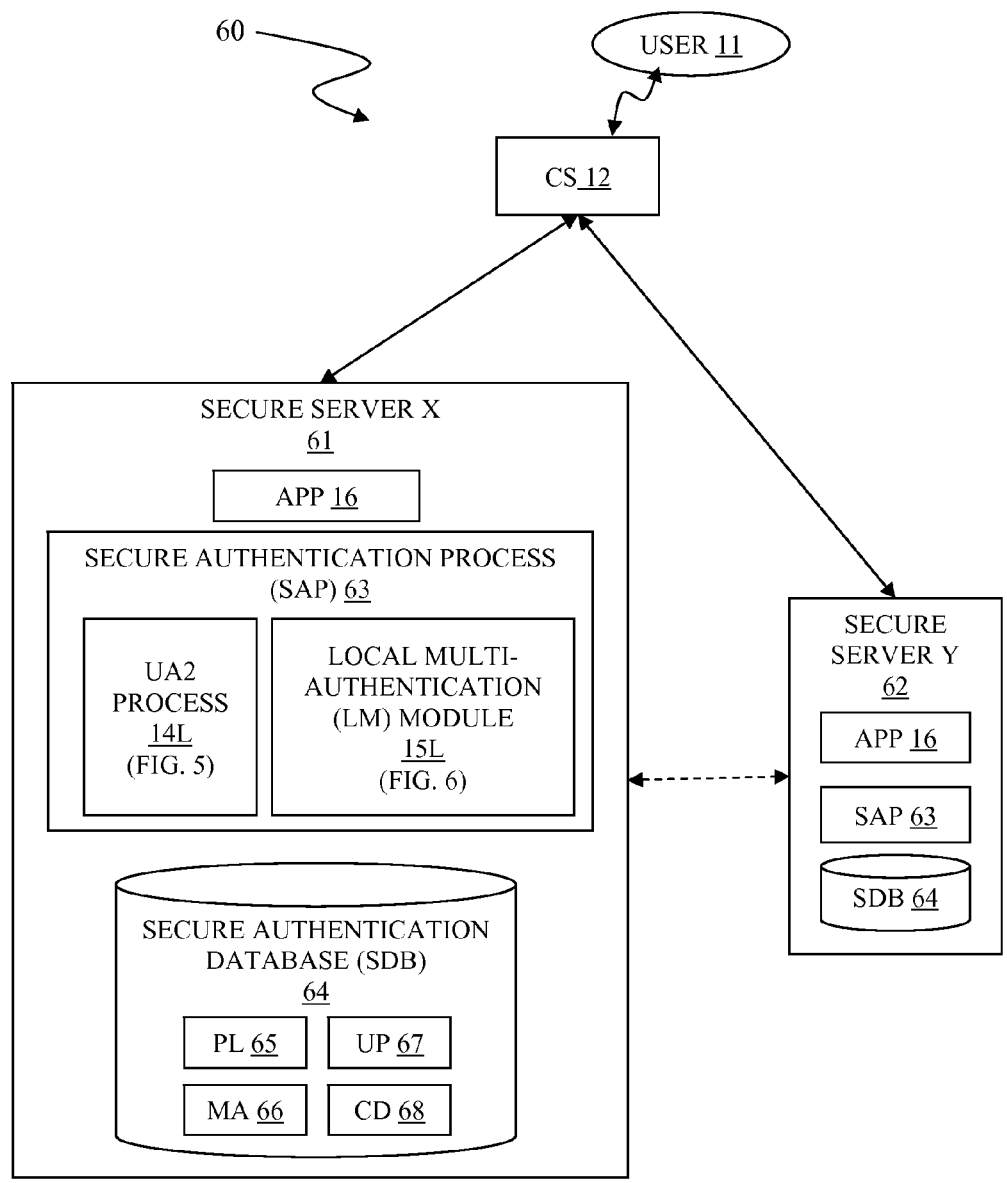
FIG. 2B illustrates a distributed system for multiple authentications from independent sources to improve site access security, in accordance with a second embodiment of the present invention.

FIG. 2B illustrates a distributed system 60 for multiple authentications from independent sources to improve site access security, in accordance with a second embodiment of the present invention.

The distributed system 60 is the second embodiment of the system 10 of FIG. 1 supra, which embodies the multiple authentications capability in each server without employing any centralized multi-authentication function and accompanying network traffic. In this specification, said each server having conventional user authentication capability and the multiple authentication capability is referred to as a secure server. At least two secure servers cooperate within the distributed system 60 for multi-authentication of the user 11. The distributed system 60 comprises the user 11, the client system 12, and at least two secure servers.

A secure server X 61 and a secure server Y 62 of said at least two secure servers comprise a respective service application 16, a respective secure authentication (SA) process 63, and a respective secure authentication database (SDB) 64. The secure server X 61 and the secure server Y 62 are functionally identical in practicing the second embodiment of the present invention.

The SA process 63 comprises a user authentication (UA2) process 14L and a local multi-authentication (LM) module 15L. The UA2 process 14L performs conventional user authentication for the secure server X 61 by use of data stored in the LADB 43. In this specification, the respective user authentication process of the secure servers that invokes the LM module 15L is referred to as the "UA2 process" in contrast to the user authentication (UA1) processes in the first embodiment of FIG. 2A, infra.

The UA2 process 14L invokes the LM module 15L pursuant to a value of a multi-authentication flag 66 of the SDB 64 for multi-authentication of the user 11 in accessing the web application 16 provided by the secure server X 61. See description of FIG. 5 infra for steps performed by the UA2 process 14L. The multi-authentication flag 66 is functionally identical to the multi-authentication flag 22 of FIG. 1 supra.

The LM module 15L provides multi-authentication capability for the UA2 process 14L of the secure server X 61 by use of data stored in the SDB 64 and in cooperation with LM modules of other secure servers within the distributed system 60. See description of FIG. 6 infra for steps performed by the LM module 15L.

The secure authentication database (SDB) 64 comprises a peer list 65, the multi-authentication flag 66, a user profile 67, and connection data 68. The peer list 65 identifies all secure servers that cooperate in multi-authentication of the user 11 within the distributed system 60. Accordingly, the LM module 15L of any secure server within the distributed system 60 communicates the connection data 68 with LM modules of any other secure server listed in the peer list 65. In another embodiment of the present invention, the peer list 65 comprises a distinctive set of secure servers necessary for multi-authentication of each user and stored as part of the user profile. Each secure server may be identified by, inter alia, a respective Internet Protocol (IP) address, etc. The user profile 67 and the connection data 68 are functionally identical to the user profile 23 and the connection data 24 of FIG. 1 supra, respectively.

Figure 3:
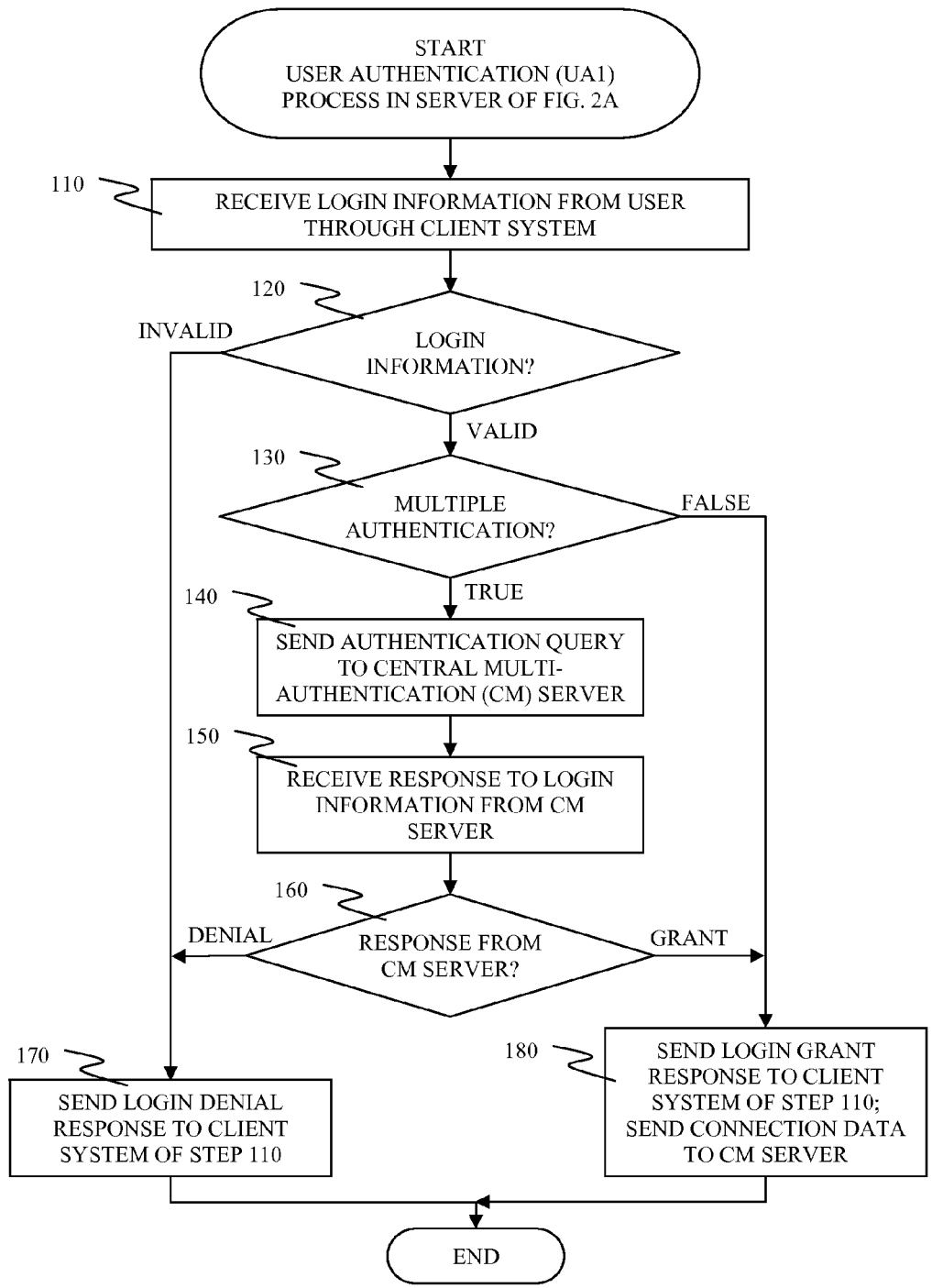
FIG. 3 is a flowchart depicting a method for multiple authentications from independent sources to improve site access security as performed by the user authentication process in a server of FIG. 2A, in accordance with the first embodiment of the present invention.

FIG. 3 is a flowchart depicting a method for multiple authentications from independent sources to improve site access security as performed by the user authentication process in a server of FIG. 2A, supra, in accordance with the first embodiment of the present invention.

The user authentication (UA1) process repeats a loop comprising steps 110 through 180 for each attempt by a user of a client system to access the service application provided by the server.

In step 110, the UA1 process receives login information from the user using the client system as the user inputs the login information to access the service application provided by the server. The login information input from the user is a tuple comprising {Input_UserId, Input_Password}. The user tries to sign in with an account identified by a value of Input_UserId, with a corresponding password represented by a value of Input_Password. Then the UA1 process proceeds with step 120.

In step 120, the UA1 process checks the received login information against the login credentials stored in the local authentication database (LADB). The login credentials comprises a tuple (LC_UserId, LC_Password), as noted in descriptions of FIG. 2A supra, that is provided by the user upon registering with the service application. The UA1 process determines that the login information is valid if the received login information has a matching tuple within the login credentials, which is, (LC_UserId, LC_Password), wherein (Input_UserId=LC_UserId), and (Input_Password=LC_Password). If UA1 process determines that the login information is valid, then the UA1 process proceeds with step 130. If the UA1 process determines that the login information is not valid, then the UA1 process proceeds with step 170.

In step 130, the UA1 process determines if multi-authentication is required and available for the user to access the service application by examining a value of the multi-authentication flag stored in the LADB. In this specification, the service application is presumed to require multi-authentication when available to grant access to the user. The multi-authentication flag is initially "TRUE" wherein the user accesses the service application for the first time from the client system. If the value of the multi-authentication flag is "TRUE", then the UA1 process proceeds with step 140 because the multi-authentication is currently available in authenticating the user. If the value of the multi-authentication flag is "FALSE", then the UA1 process proceeds with step 180 because the multi-authentication capability is currently not available in authenticating the user.

In step 140, the UA1 process sends an authentication message to the central multi-authentication (CM) server. The authentication message is a triplet (Q_ClientAddr, Q_App, Q_UserId), wherein a value of Q_ClientAddr indicates a unique address of the client system, wherein a value of Q_App indicates the service application the user attempts to access with the login information, and wherein a value of Q_UserId uniquely identifies the user. Then the UA1 process proceeds with step 150.

Figure 4:
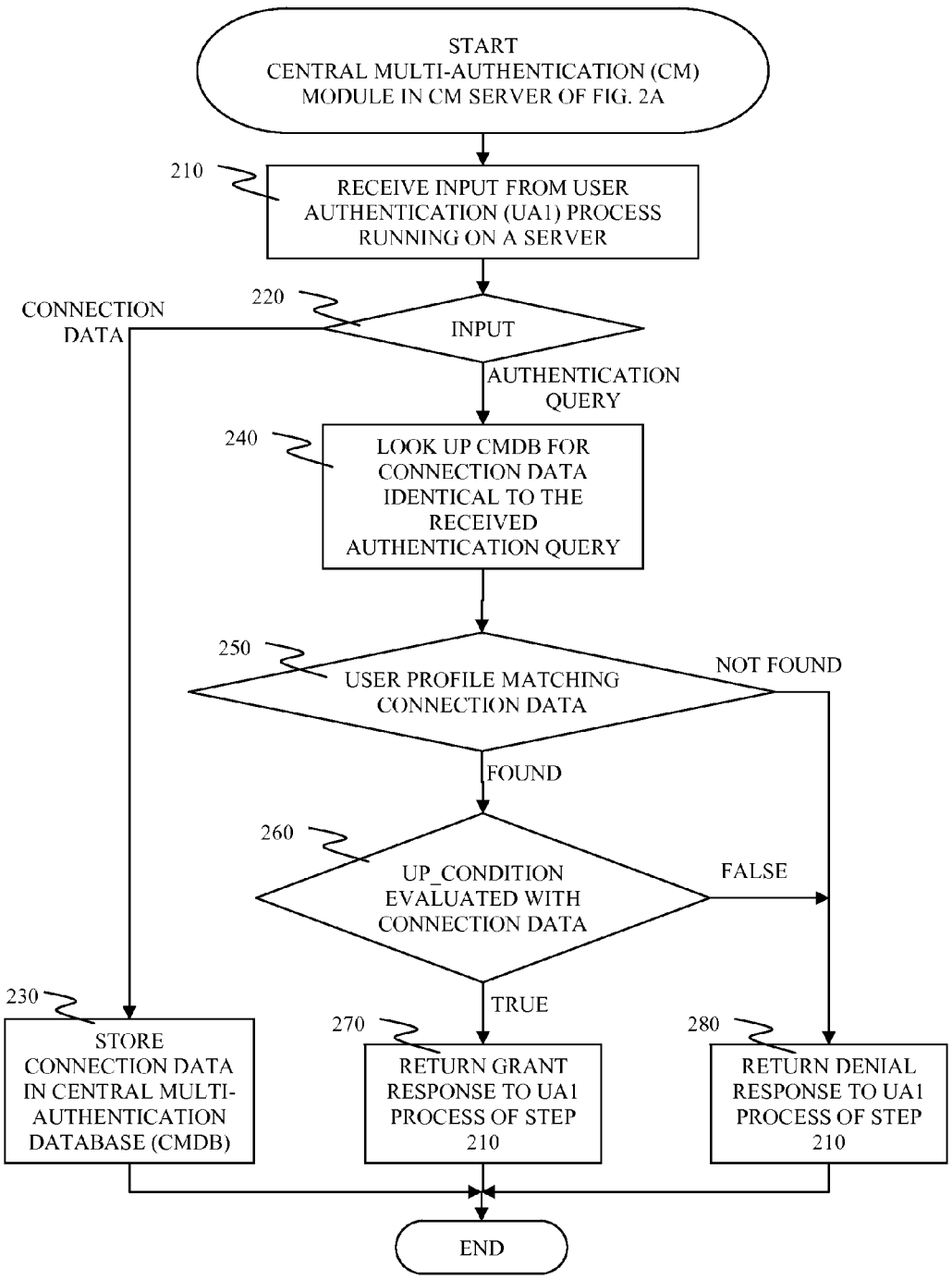
FIG. 4 is a flowchart depicting a method for multiple authentications from independent sources to improve site access security as performed by the central multi-authentication (CM) module in a CM server of FIG. 2A, in accordance with the first embodiment of the present invention.

In step 150, the UA1 process receives a response granting or denying access for the user, responsive to step 260 of FIG. 4 infra, performed by the CM module. In one embodiment of the present invention, the response comprises (R_ClientAddr, R_App, R_UserId, R_Grant). In the same embodiment, a value of "R_Grant" is selected from {TRUE, FALSE}, wherein "TRUE" and "FALSE" indicates a grant and a denial of access by the user R_UserId through the client system R_ClientAddr to the service application R_App, respectively. Then the UA1 process proceeds with step 160.

In step 160, the UA1 process determines if the response received in step 150 is a grant or a denial of access. If the UA1 process determines that the response is a denial, then the UA1 process proceeds with step 170. If the UA1 process determines that the response is a grant, then the UA1 process proceeds with step 180.

In step 170, the UA1 process sends the denial response to the received login information to the client system of step 110 supra. Then the UA1 process terminates processing the received login information.

In step 180, the UA1 process sends the grant response to the received login information to the client system of step 110 supra and sends the connection data to the central multi-authentication (CM) server such that the central multi-authentication (CM) module utilizes the connection data for later multi-authentication for the user. See descriptions of FIG. 4 infra for steps performed by the CM module. Then, the UA1 process terminates processing the received login information.

FIG. 4 is a flowchart depicting a method for multiple authentications from independent sources to improve site access security as performed by the central multi-authentication (CM) module in a CM server of FIG. 2A, supra, in accordance with the first embodiment of the present invention.

The CM module repeats a loop comprising steps 210 through 260 for each input from the UA1 process.

In step 210, the CM module receives an input from the UA1 process which performs step 140 or step 180 of FIG. 3 supra. Then the CM module proceeds with step 220.

In step 220, the CM module determines whether the received input is the connection data received from the UA1 process in response to step 180 of FIG. 3 supra or an authentication message received from the UA1 process in response to step 140 of FIG. 3 supra. If the CM module determines that the received input is the connection data from the UA1 process, then the CM module proceeds with step 230. If the CM module determines that the received input is the authentication message from the UA1 process, then the CM module proceeds with step 240.

In step 230, the CM module stores the connection data for granted access as received from the UA1 process in the CMDB for later multiple authentication. Then the CM module terminates process input received in step 210.

In another embodiment of the present invention, the CM module is configured to automatically receive connection data every time a connection status between the client system and the server changes, selected from {CONNECTED (1), DISCONNECTED (0)}, in addition to an attempt to login by the user from step 210 supra. Accordingly, the CM module updates the connection data of the CMDB upon receiving a new piece of connection data.

In step 240, the CM module searches the CMDB for a connection data (C_ClientAddr, C_App, C_UserId, C_Status) of which client address matches the client address of the authentication message (Q_ClientAddr, Q_App, Q_UserId) received from the UA1 process, that is C_ClientAddr=Q_ClientAddr. The CM module stores all matching records and makes available for the CM module in step 260 infra. Then the CM module proceeds with step 250.

In step 250, the CM module searches the CMDB for a user profile (UP_App, UP_UserId, UP_Condition) that matches the connection data found in step 240 supra, that is UP_App=C_App, UP_UserId=C_UserId. If the CM module finds the user profile matching the connection data, then the CM module proceeds with step 260. If the CM module does not find the user profile matching the connection data, then the CM module proceeds with step 280.

In step 260, the CM module evaluates the logical condition UP_Condition in the user profile located from step 250 by applying the connection data from step 240 to the logical condition UP_Condition. If the CM module determines that the logical condition UP_Condition is satisfied by values of the connection data, then the CM module proceeds with step 270. If the CM module determines that the logical condition UP_Condition is not satisfied by values of the connection data, then the CM module proceeds with step 280.

In step 270, the CM module returns a grant response that permits the user from the client system to access the service application to the UA1 process. Then the CM module terminates process input received in step 210.

In step 280, the CM module returns a denial response that rejects the user from the client system to access the service application to the UA1 process. Then the CM module terminates process input received in step 210.

Figure 5:
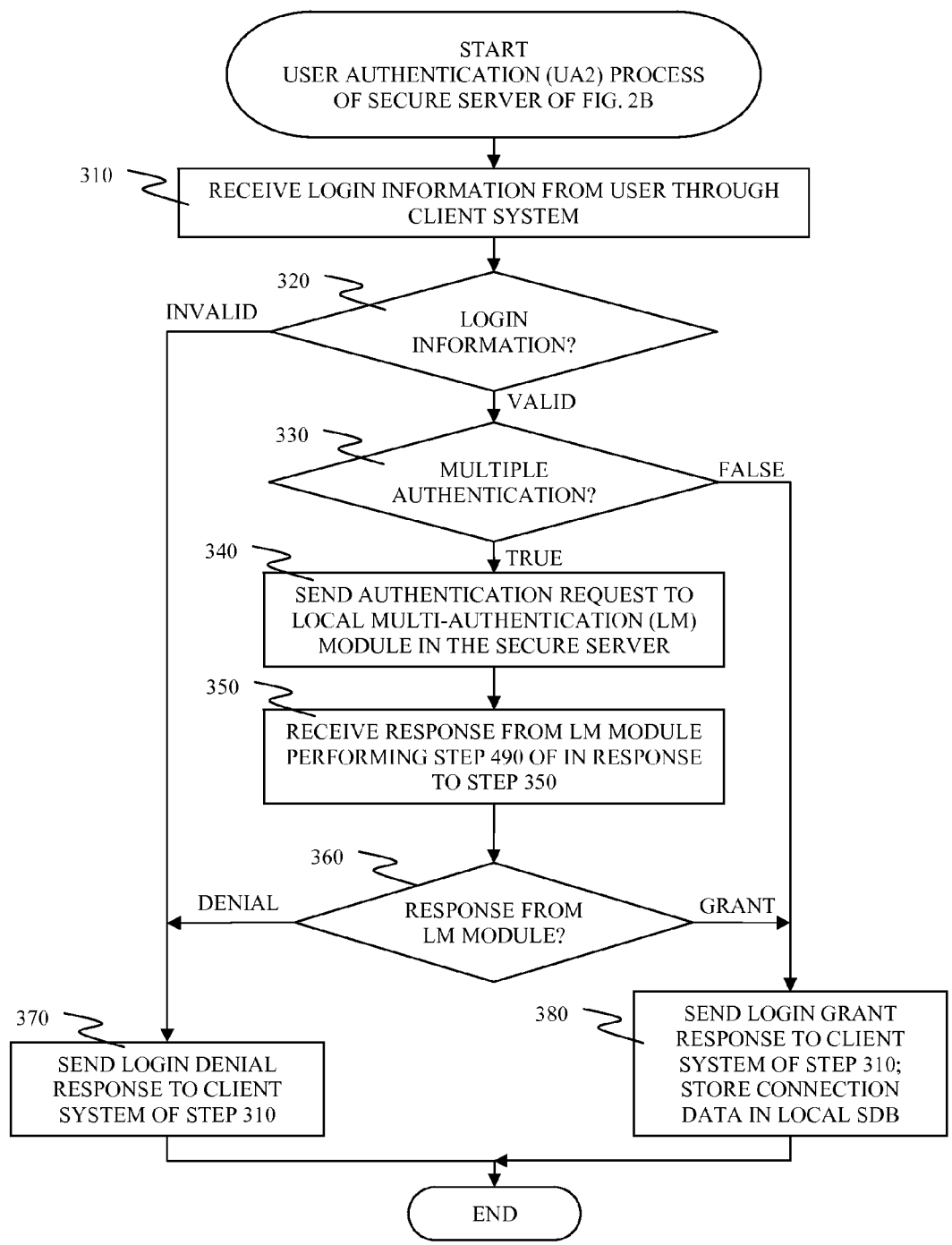
FIG. 5 is a flowchart depicting a method for multiple authentications from independent sources to improve site access security as performed by the user authentication process in a secure server of FIG. 2B, in accordance with the second embodiment of the present invention.

FIG. 5 is a flowchart depicting a method for multiple authentications from independent sources to improve site access security as performed by the user authentication process in a secure server of FIG. 2B, supra, in accordance with the second embodiment of the present invention.

The user authentication (UA2) process in respective secure servers repeats a loop comprising steps 310 through 380 for each attempt by a user of a client system to access the service application provided by the secure server.

In step 310, the UA2 process receives login information from the user using the client system as the user inputs the login information to access the service application provided by the secure server. The login information input from the user is a tuple comprising {Input_UserId, Input_Password}. The user tries to sign in with an account identified by a value of Input_UserId, with a corresponding password represented by a value of Input_Password. Then the UA2 process proceeds with step 320.

In step 320, the UA2 process checks the received login information against the user profile stored in the secure authentication database (SDB) of the secure server. The user profile comprises (UP_App, UP_UserId, UP_Condition), as noted in descriptions of FIG. 1 supra, that is provided by the user upon registering with the service application. The UA2 process determines that the login information is valid if the received login information satisfies the user profile, which is, for the tuple identified by both UP_App and UP_UserId, (Input_UserId=UP_UserId). If UA2 process determines that the login information is valid, then the UA2 process proceeds with step 330. If the UA2 process determines that the login information is not valid, then the UA2 process proceeds with step 370.

In step 330, the UA2 process determines if multi-authentication is required and available for the user to access the service application UP_App by examining a value of the multi-authentication flag stored in the SDB. In this specification, the service application is presumed to require multi-authentication when available to grant access to the user. The multi-authentication flag is initially "TRUE" wherein the user accesses the service application for the first time from the client system. If the value of the multi-authentication flag is "TRUE", then the UA2 process proceeds with step 340 because the multi-authentication is currently available in authenticating the user. If the value of the multi-authentication flag is "FALSE", then the UA2 process proceeds with step 380 because the multi-authentication capability is currently not available in authenticating the user.

In step 340, the UA2 process sends an authentication request to the local multi-authentication (LM) module within the same secure server as the UA2 process. The authentication request comprises {Q_ClientAddr, Q_App, Q_UserID}, which requests the LM Module to analyze the current connection data for the client system having a unique address of "Q_ClientAddr". Then the UA2 process proceeds with step 350.

Figure 6:
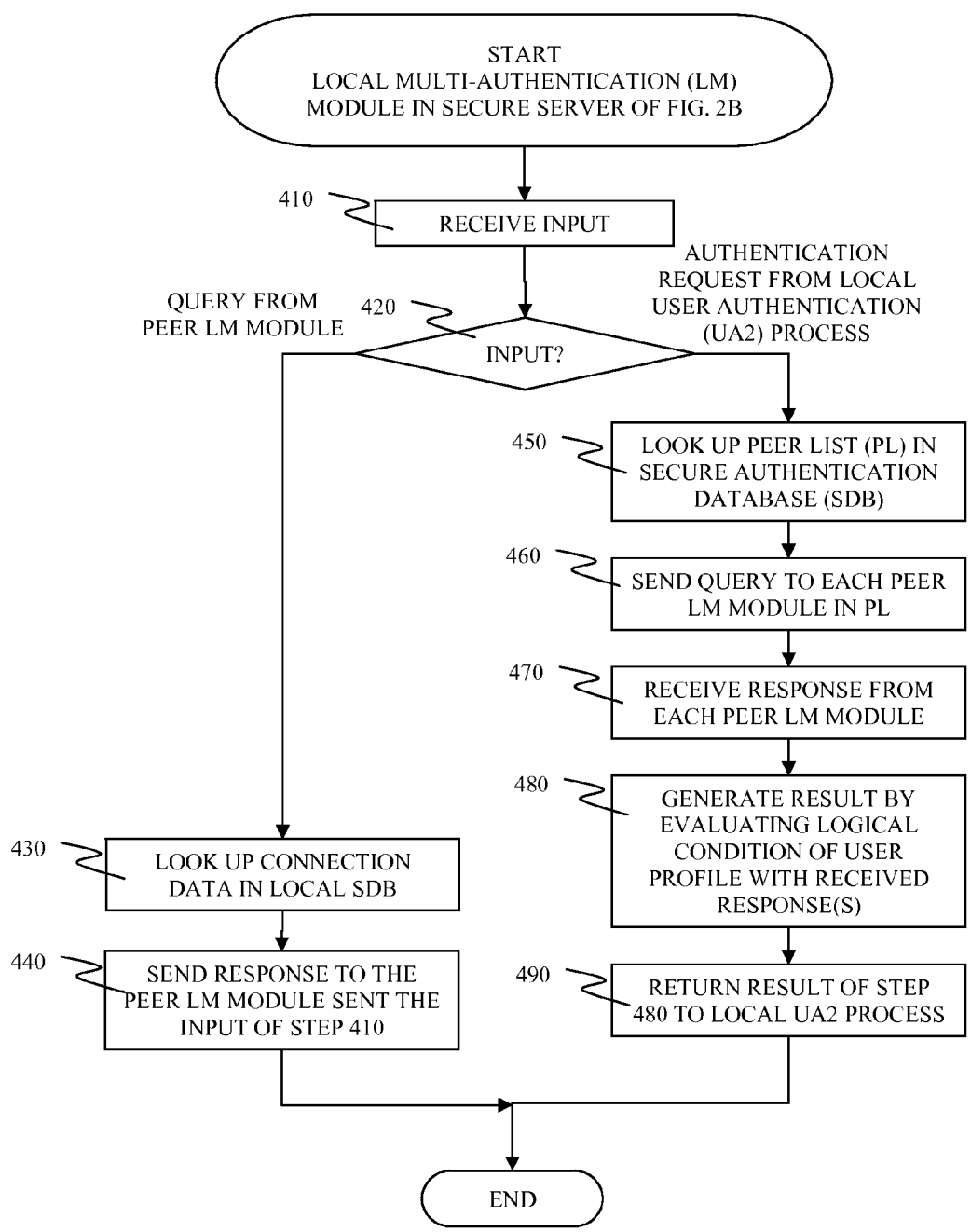
FIG. 6 is a flowchart depicting a method for multiple authentications from independent sources to improve site access security as performed by the local multi-authentication (LM) module in the secure server of FIG. 2B, in accordance with the second embodiment of the present invention.

In step 350, the UA2 process receives a response granting or denying access for the user, responsive to step 490 of FIG. 6 infra, performed by the LM module. In one embodiment of the present invention, the response comprises (R_ClientAddr, R_App, R_UserId, R_Grant). In the same embodiment, a value of "R_Grant" is selected from {TRUE, FALSE}, wherein "TRUE" and "FALSE" indicates a grant and a denial of access by the user R_UserId through the client system R_ClientAddr to the service application R_App, respectively. Then the UA2 process proceeds with step 360.

In step 360, the UA2 process determines if the response received in step 350 is a grant or a denial of access. If the UA2 process determines that the response is a denial, then the UA2 process proceeds with step 370. If the UA2 process determines that the response is a grant, then the UA2 process proceeds with step 380.

In step 370, the UA2 process sends the denial response to the received login information to the client system of step 310 supra. Then the UA2 process terminates processing the received login information.

In step 380, the UA2 process sends the grant response to the received login information to the client system of step 310 supra and stores the connection data in the local secure authentication database (SDB). Then, the UA2 process terminates processing the received login information.

FIG. 6 is a flowchart depicting a method for multiple authentications from independent sources to improve site access security as performed by the local multi-authentication (LM) module in the secure server of FIG. 2B, supra, in accordance with the second embodiment of the present invention.

In step 410, the LM module receives an input from the UA2 process or from another LM module performing step 450 infra, wherein said another LM module runs in one of secure servers listed in the peer list of the SDB. Then the LM module proceeds with step 420.

In step 420, the LM module determines whether the received input is a query from a peer LM module or an authentication request from a local UA2 process. If the LM module determines that the received input is a query from a peer LM module, then the LM module proceeds with step 430. If the LM module determines that the received input is the authentication request from the local UA2 process, then the LM module proceeds with step 450.

In step 430, the LM module looks up the local SDB for connection data (C_ClientAddr, C_App, C_UserId, C_Status) of which client address matches the client address of the query (Q_ClientAddr) received from the peer LM modules, that is C_ClientAddr=Q_ClientAddr. The LM module subsequently checks values of connection status C_Status of the matched connection data. Then the LM module proceeds with step 450. Then the LM module proceeds with step 440.

In step 440, the LM module sends a response comprising connection status of the user to a specific service application from the connection data found in step 430, that is (C_App, C_UserId, C_Status), to the peer LM module which had sent the query in step 410 supra. If the LM module had not located any connection data from step 430, then the LM module returns NULL (φ) to the UA2 process. Then the LM module terminates processing the input.

In step 450, the LM module looks up the peer list stored in the SDB. Then the LM module proceeds with step 460.

In step 460, the LM module sends a query comprising {Q_ClientAddr, Q_App, Q_UserID} to each peer LM module listed in the peer list. Then the LM module proceeds with step 470.

In step 470, the LM module receives a respective response from each peer LM module responsive to step 440 supra performed by said each peer LM module. Then the LM module proceeds with step 480.

In step 480, the LM module generates a result for the authentication request received in step 410 supra by evaluating the logical condition of the user profile with responses received from peer LM modules. Then the LM module proceeds with step 490.

In step 490, the LM module returns the result generated in step 480 supra granting or denying access of the user to the local UA2 process that had sent the authentication request in step 340 of FIG. 5 supra. Then, the LM module terminates processing the received input.

Figure 7:
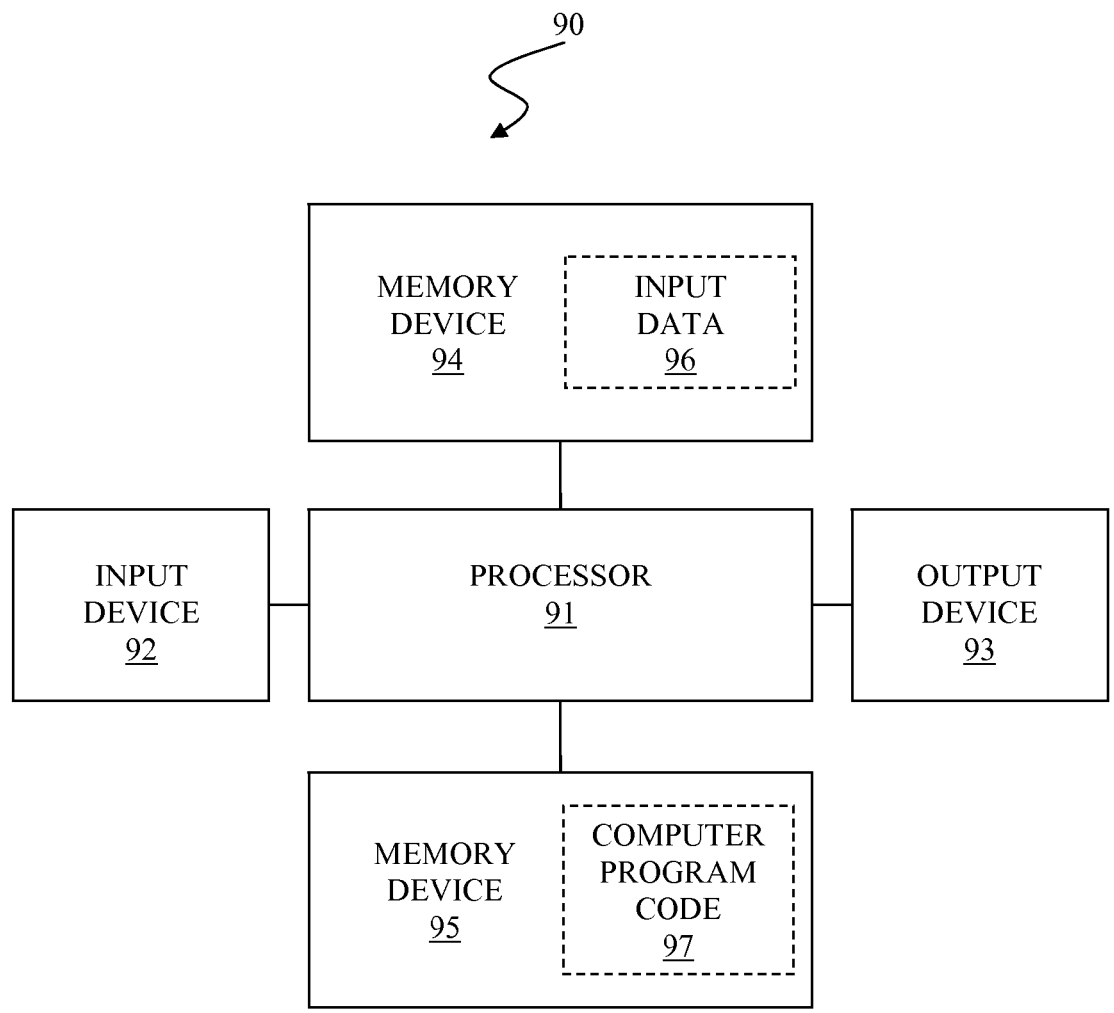
FIG. 7 illustrates a computer system used for multiple authentications from independent sources to improve site access security, in accordance with the embodiments of the present invention.

FIG. 7 illustrates a computer system used for multiple authentications from independent sources to improve site access security, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for multiple authentications by independent sources for enhanced site access security of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for multiple authentications by independent sources for enhanced site access security.

In another embodiment, the invention provides a method that performs the process steps of the invention on a subscription, advertising and/or fee basis. That is, a service provider, such as a Solution Integrator, can offer to create, maintain, support, etc., a process for multiple authentications by independent sources for enhanced site access security of the present invention. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represents a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing enhanced site access security by use of multiple authentications from independent sources, the method comprising:

receiving, by a user authentication process running in a server, login information from a user accessing a service application from a client system, wherein a security enhanced user service system comprises the user authentication process, the service application, a multi-authentication module and an authentication database, the security enhanced user service system coupled to the client system;

determining that the received login information is valid;

sending a multi-authentication data to the multi-authentication module, wherein the multi-authentication data is selected from a first group consisting of a connection data to a central multi-authentication (CM) module, an authentication query to the CM module, and an authentication request to a first local multi-authentication (LM) module, and wherein, in said sending, the user authentication process sends the connection data to the central multi-authentication (CM) module;

receiving, by the CM module, the connection data comprising values of C_ClientAddr, C_App, C_UserId, and C_Status, wherein a first value C_ClientAddr identifies the client system, wherein a second value C_App identifies the service application, wherein a third value C_UserID identifies the user who attempts to log in to a Q_App service application from a Q_ClientAddr client system, and wherein a fourth value C_Status is selected from a group consisting TRUE (1) and FALSE (0), wherein TRUE represents that the user C_UserID is currently signed in with the service application C_App, and wherein FALSE represents that the user C_UserID is not signed in with the service application C_App;

storing the received connection data in a central multi-authentication (CM) database that is coupled to the CM module;

receiving a response responsive to said sending, wherein the response is selected from a second group consisting of a grant response and a denial response in accordance with content of the authentication database, wherein the grant response permits the user to access the service application from the client system, and wherein the denial response prohibits the user from accessing the service application from the client system; and communicating the received response to the user of the client system.

2. The method of claim 1, wherein, in said sending, the user authentication process sends the authentication query to the central multi-authentication (CM) module, the method further comprising:

receiving, by the CM module, the authentication query comprising values of Q_ClientAddr, Q_App, and Q_UserID, wherein a first value Q_ClientAddr identifies the client system, wherein a second value Q_App identifies the service application, and wherein a third value Q_UserID identifies the user who attempts to log in to the Q_App service application from the Q_ClientAddr client system;

locating a connection data that matches a received authentication message from a central multi-authentication (CM) database coupled to the CM module, wherein the CM database comprises at least one connection data and at least one user profile, the connection data comprising values of C_ClientAddr, C_App, C_UserId, and C_Status, wherein a value of C_ClientAddr is identical to the first value Q_ClientAddr, wherein a value of C_App is identical to the second value Q_App, and wherein a value of C_UserId is identical to the third value Q_UserId;

identifying a user profile of said at least one user profile, the user profile comprising values of UP_App, UP_UserId, and UP_Condition, wherein a value of UP_App is identical to the value of C_App, wherein a value of UP_UserId is identical to the value C_UserId, and wherein UP_Condition is a logical condition to satisfy for the user Q_UserId to access the service application Q_App from the client system Q_ClientAddr;

determining that the logical condition UP_Condition is TRUE (1) as a result of evaluating the logical condition UP_Condition by use of the values of the connection data C_ClientAddr, C_App, C_UserId, and C_Status; and returning the grant response to the user authentication process that had sent the authentication message.

3. The method of claim 1, wherein, in said sending, the user authentication process sends the authentication request to the first local multi-authentication (LM) module, the method further comprising:

receiving, by the first LM module, the authentication request comprising Q_ClientAddr, Q_App, and Q_UserID, wherein a first value Q_ClientAddr identifies the client system, wherein a second value Q_App identifies the service application, and wherein a third value Q_UserID identifies the user who attempts to log in to the Q_App service application from the Q_ClientAddr client system;

identifying at least one peer security enhanced user service system from a peer list stored in a secure authentication database (SDB), wherein the SDB is locally coupled to the first LM module, wherein the SDB comprises the peer list, at least one connection data, and at least one user profile;

propagating a respective query comprising Q_ClientAddr, Q_App, and Q_UserID, to a respective LM module of the identified at least one peer security enhanced user service system;

receiving a respective response from the respective LM module, wherein said respective response comprises a respective connection data as searched in each secure authentication database (SDB) locally couple to the respective LM module of said at least one peer security enhanced user service system;

determining that a logical condition UP_Condition associated with the authentication request is TRUE (1) as a result of evaluating the logical condition UP_Condition stored in the SDB by use of the values of the respective response from said at least one peer security enhanced user service system; and returning the grant response to the user authentication process that had sent the authentication request, wherein the user authentication process and the first LM module run on a same physical computer system.

4. The method of claim 3, wherein a k-th local multi-authentication (LM) module is selected from the respective LM module, the method further comprising:

in response to said propagating, receiving the propagated query addressed to the k-th LM module;

searching a k-th secure authentication database (SDB) locally coupled to the k-th LM module for a k-th connection data matching the received propagated query; and responding to the received propagated query with the k-th connection data comprising C_ClientAddr, C_App, C_UserId, and C_Status, wherein a value of C_ClientAddr is identical to the first value Q_ClientAddr, wherein a value of C_App is identical to the second value Q_App, wherein a value of C_UserId is identical to the third value Q_UserId, and wherein a value C_Status is selected from a group consisting TRUE (1) and FALSE (0), wherein TRUE represents that the user C_UserID is currently signed in with the service application C_App from the client system C_ClientAddr, and wherein FALSE represents that the user C_UserID is not signed in with the service application C_App from the client system C_ClientAddr.

5. A computer program product comprising:

a computer readable hardware storage device storing a computer readable program code, said computer readable program code containing instructions that perform providing enhanced site access security by use of multiple authentications from independent sources, said providing comprising:

receiving, by a user authentication process running in a server, login information from a user accessing a service application from a client system, wherein a security enhanced user service system comprises the user authentication process, the service application, a multi-authentication module and an authentication database, the security enhanced user service system coupled to the client system;

determining that the received login information is valid;

sending a multi-authentication data to the multi-authentication module, wherein the multi-authentication data is selected from a first group consisting of a connection data to a central multi-authentication (CM) module, an authentication query to the CM module, and an authentication request to a first local multi-authentication (LM) module, and wherein, in said sending, the user authentication process sends the connection data to the central multi-authentication (CM) module;

receiving, by the CM module, the connection data comprising values of C_ClientAddr, C_App, C_UserId, and C_Status, wherein a first value C_ClientAddr identifies the client system, wherein a second value C_App identifies the service application, wherein a third value C_UserID identifies the user who attempts to log in to a Q_App service application from a Q_ClientAddr client system, and wherein a fourth value C_Status is selected from a group consisting TRUE (1) and FALSE (0), wherein TRUE represents that the user C_UserID is currently signed in with the service application C_App, and wherein FALSE represents that the user C_UserID is not signed in with the service application C_App;

storing the received connection data in a central multi-authentication (CM) database that is coupled to the CM module;

receiving a response responsive to said sending, wherein the response is selected from a second group consisting of a grant response and a denial response in accordance with content of the authentication database, wherein the grant response permits the user to access the service application from the client system, and wherein the denial response prohibits the user from accessing the service application from the client system; and communicating the received response to the user of the client system.

6. The computer program product of claim 5, wherein, in said sending, the user authentication process sends the authentication query to the central multi-authentication (CM) module, said providing further comprising:

receiving, by the CM module, the authentication query comprising values of Q_ClientAddr, Q_App, and Q_UserID, wherein a first value Q_ClientAddr identifies the client system, wherein a second value Q_App identifies the service application, and wherein a third value Q_UserID identifies the user who attempts to log in to the Q_App service application from the Q_ClientAddr client system;

locating a connection data that matches a received authentication message from a central multi-authentication (CM) database coupled to the CM module, wherein the CM database comprises at least one connection data and at least one user profile, the connection data comprising values of C_ClientAddr, C_App, C_UserId, and C_Status, wherein a value of C_ClientAddr is identical to the first value Q_ClientAddr, wherein a value of C_App is identical to the second value Q_App, and wherein a value of C_UserId is identical to the third value Q_UserId;

identifying a user profile of said at least one user profile, the user profile comprising values of UP_App, UP_UserId, and UP_Condition, wherein a value of UP_App is identical to the value of C_App, wherein a value of UP_UserId is identical to the value C_UserId, and wherein UP_Condition is a logical condition to satisfy for the user Q_UserId to access the service application Q_App from the client system Q_ClientAddr;

determining that the logical condition UP_Condition is TRUE (1) as a result of evaluating the logical condition UP_Condition by use of the values of the connection data C_ClientAddr, C_App, C_UserId, and C_Status; and returning the grant response to the user authentication process that had sent the authentication message.

7. The computer program product of claim 5, wherein, in said sending, the user authentication process sends the authentication request to the first local multi-authentication (LM) module, said providing further comprising:

receiving, by the first LM module the authentication request comprising Q_ClientAddr, Q_App, and Q_UserID, wherein a first value Q_ClientAddr identifies the client system, wherein a second value Q_App identifies the service application, and wherein a third value Q_UserID identifies the user who attempts to log in to the Q_App service application from the Q_ClientAddr client system;

identifying at least one peer security enhanced user service system from a peer list stored in a secure authentication database (SDB), wherein the SDB is locally coupled to the first LM module, wherein the SDB comprises the peer list, at least one connection data, and at least one user profile;

propagating a respective query comprising Q_ClientAddr, Q_App, and Q_UserID, to a respective LM module of the identified at least one peer security enhanced user service system;

receiving a respective response from the respective LM module, wherein said respective response comprises a respective connection data as searched in each secure authentication database (SDB) locally couple to the respective LM module of said at least one peer security enhanced user service system;

determining that a logical condition UP_Condition associated with the authentication request is TRUE (1) as a result of evaluating the logical condition UP_Condition stored in the SDB by use of the values of the respective response from said at least one peer security enhanced user service system; and returning the grant response to the user authentication process that had sent the authentication request, wherein the user authentication process and the first LM module run on a same physical computer system.

8. The computer program product of claim 7, wherein a k-th local multi-authentication (LM) module is selected from the respective LM module, said providing further comprising:

in response to said propagating, receiving the propagated query addressed to the k-th LM module;

searching a k-th secure authentication database (SDB) locally coupled to the k-th LM module for a k-th connection data matching the received propagated query; and responding to the received propagated query with the k-th connection data comprising C_ClientAddr, C_App, C_UserId, and C_Status, wherein a value of C_ClientAddr is identical to the first value Q_ClientAddr, wherein a value of C_App is identical to the second value Q_App, wherein a value of Q_UserId is identical to the third value Q_UserId, and wherein a value C_Status is selected from a group consisting TRUE (1) and FALSE (0), wherein TRUE represents that the user C_UserID is currently signed in with the service application C_App from the client system C_ClientAddr, and wherein FALSE represents that the user C_UserID is not signed in with the service application C_App from the client system C_ClientAddr.

9. A computer system comprising:

a processor, a memory coupled to the processor, and a computer readable storage device coupled to the processor, said storage device containing program code configured to be executed by the processor via the memory to implement a method for providing enhanced site access security by use of multiple authentications from independent sources, said providing comprising:

receiving, by a user authentication process running in a server, login information from a user accessing a service application from a client system, wherein a security enhanced user service system comprises the user authentication process, the service application, a multi-authentication module and an authentication database, the security enhanced user service system coupled to the client system;

determining that the received login information is valid;

sending a multi-authentication data to the multi-authentication module, wherein the multi-authentication data is selected from a first group consisting of a connection data to a central multi-authentication (CM) module, an authentication query to the CM module, and an authentication request to a first local multi-authentication (LM) module, and wherein, in said sending, the user authentication process sends the connection data to the central multi-authentication (CM) module;

receiving, by the CM module, the connection data comprising values of C_ClientAddr, C_App, C_UserId, and C_Status, wherein a first value C_ClientAddr identifies the client system, wherein a second value C_App identifies the service application, wherein a third value C_UserID identifies the user who attempts to log in to a Q_App service application from a Q_ClientAddr client system, and wherein a fourth value C_Status is selected from a group consisting TRUE (1) and FALSE (0), wherein TRUE represents that the user C_UserID is currently signed in with the service application C_App, and wherein FALSE represents that the user C_UserID is not signed in with the service application C_App;

storing the received connection data in a central multi-authentication (CM) database that is coupled to the CM module;

receiving a response responsive to said sending, wherein the response is selected from a second group consisting of a grant response and a denial response in accordance with content of the authentication database, wherein the grant response permits the user to access the service application from the client system, and wherein the denial response prohibits the user from accessing the service application from the client system; and communicating the received response to the user of the client system.

10. The computer system of claim 9, wherein, in said sending, the user authentication process sends the authentication query to the central multi-authentication (CM) module, said providing further comprising:

receiving, by the CM module, the authentication query comprising values of Q_ClientAddr, Q_App, and Q_UserID, wherein a first value Q_ClientAddr identifies the client system, wherein a second value Q_App identifies the service application, and wherein a third value Q_UserID identifies the user who attempts to log in to the Q_App service application from the Q_ClientAddr client system;

locating a connection data that matches a received authentication message from a central multi-authentication (CM) database coupled to the CM module, wherein the CM database comprises at least one connection data and at least one user profile, the connection data comprising values of C_ClientAddr, C_App, C_UserId, and C_Status, wherein a value of C_ClientAddr is identical to the first value Q_ClientAddr, wherein a value of C_App is identical to the second value Q_App, and wherein a value of C_UserId is identical to the third value Q_UserId;

identifying a user profile of said at least one user profile, the user profile comprising values of UP_App, UP_UserId, and UP_Condition, wherein a value of UP_App is identical to the value of C_App, wherein a value of UP_UserId is identical to the value C_UserId, and wherein UP_Condition is a logical condition to satisfy for the user Q_UserId to access the service application Q_App from the client system Q_ClientAddr;

determining that the logical condition UP_Condition is TRUE (1) as a result of evaluating the logical condition UP_Condition by use of the values of the connection data C_ClientAddr, C_App, C_UserId, and C_Status; and returning the grant response to the user authentication process that had sent the authentication message.

11. The computer system of claim 9, wherein, in said sending, the user authentication process sends the authentication request to the first local multi-authentication (LM) module, said providing further comprising:

receiving, by the first LM module, the authentication request comprising Q_ClientAddr, Q_App, and Q_UserID, wherein a first value Q_ClientAddr identifies the client system, wherein a second value Q_App identifies the service application, and wherein a third value Q_UserID identifies the user who attempts to log in to the Q_App service application from the Q_ClientAddr client system;

identifying at least one peer security enhanced user service system from a peer list stored in a secure authentication database (SDB), wherein the SDB is locally coupled to the first LM module, wherein the SDB comprises the peer list, at least one connection data, and at least one user profile;

propagating a respective query comprising Q_ClientAddr, Q_App, and Q_UserID, to a respective LM module of the identified at least one peer security enhanced user service system;

receiving a respective response from the respective LM module, wherein said respective response comprises a respective connection data as searched in each secure authentication database (SDB) locally couple to the respective LM module of said at least one peer security enhanced user service system;

determining that a logical condition UP_Condition associated with the authentication request is TRUE (1) as a result of evaluating the logical condition UP_Condition stored in the SDB by use of the values of the respective response from said at least one peer security enhanced user service system; and returning the grant response to the user authentication process that had sent the authentication request, wherein the user authentication process and the first LM module run on a same physical computer system.

12. The computer system of claim 11, wherein a k-th local multi-authentication (LM) module is selected from the respective LM module, said providing further comprising:

in response to said propagating, receiving the propagated query addressed to the k-th LM module;

searching a k-th secure authentication database (SDB) locally coupled to the k-th LM module for a k-th connection data matching the received propagated query; and responding to the received propagated query with the k-th connection data comprising C_ClientAddr, C_App, C_UserId, and C_Status, wherein a value of C_ClientAddr is identical to the first value Q_ClientAddr, wherein a value of C_App is identical to the second value Q_App, wherein a value of Q_UserId is identical to the third value Q_UserId, and wherein a value C_Status is selected from a group consisting TRUE (1) and FALSE (0), wherein TRUE represents that the user C_UserID is currently signed in with the service application C_App from the client system C_ClientAddr, and wherein FALSE represents that the user C_UserID is not signed in with the service application C_App from the client system C_ClientAddr.

13. A process for supporting computer infrastructure, said process comprising providing at least one support service for at least one of creating, integrating, hosting, maintaining, and deploying computer-readable code in a computing system, wherein the code in combination with the computing system is capable of performing a method for providing enhanced site access security by use of multiple authentications from independent sources, said providing comprising:

receiving, by a user authentication process running in a server, login information from a user accessing a service application from a client system, wherein a security enhanced user service system comprises the user authentication process, the service application, a multi-authentication module and an authentication database, the security enhanced user service system coupled to the client system;

determining that the received login information is valid;

sending a multi-authentication data to the multi-authentication module, wherein the multi-authentication data is selected from a first group consisting of a connection data to a central multi-authentication (CM) module, an authentication query to the CM module, and an authentication request to a first local multi-authentication (LM) module, and wherein, in said sending, the user authentication process sends the connection data to the central multi-authentication (CM) module;

receiving, by the CM module, the connection data comprising values of C_ClientAddr, C_App, C_UserId, and C_Status, wherein a first value C_ClientAddr identifies the client system, wherein a second value C_App identifies the service application, wherein a third value C_UserID identifies the user who attempts to log in to a Q_App service application from a Q_ClientAddr client system, and wherein a fourth value C_Status is selected from a group consisting TRUE (1) and FALSE (0), wherein TRUE represents that the user C_UserID is currently signed in with the service application C_App, and wherein FALSE represents that the user C_UserID is not signed in with the service application C_App;

storing the received connection data in a central multi-authentication (CM) database that is coupled to the CM module;

receiving a response responsive to said sending, wherein the response is selected from a second group consisting of a grant response and a denial response in accordance with content of the authentication database, wherein the grant response permits the user to access the service application from the client system, and wherein the denial response prohibits the user from accessing the service application from the client system; and communicating the received response to the user of the client system.

14. The process of claim 13, wherein, in said sending, the user authentication process sends the authentication query to the central multi-authentication (CM) module, said providing further comprising:

receiving, by the CM module, the authentication query comprising values of Q_ClientAddr, Q_App, and Q_UserID, wherein a first value Q_ClientAddr identifies the client system, wherein a second value Q_App identifies the service application, and wherein a third value Q_UserID identifies the user who attempts to log in to the Q_App service application from the Q_ClientAddr client system;

locating a connection data that matches a received authentication message from a central multi-authentication (CM) database coupled to the CM module, wherein the CM database comprises at least one connection data and at least one user profile, the connection data comprising values of C_ClientAddr, C_App, C_UserId, and C_Status, wherein a value of C_ClientAddr is identical to the first value Q_ClientAddr, wherein a value of C_App is identical to the second value Q_App, and wherein a value of C_UserId is identical to the third value Q_UserId;

identifying a user profile of said at least one user profile, the user profile comprising values of UP_App, UP_UserId, and UP_Condition, wherein a value of UP_App is identical to the value of C_App, wherein a value of UP_UserId is identical to the value C_UserId, and wherein UP_Condition is a logical condition to satisfy for the user Q_UserId to access the service application Q_App from the client system Q_ClientAddr;

determining that the logical condition UP_Condition is TRUE (1) as a result of evaluating the logical condition UP_Condition by use of the values of the connection data C_ClientAddr, C_App, C_UserId, and C_Status; and returning the grant response to the user authentication process that had sent the authentication message.

15. The process of claim 13, wherein, in said sending, the user authentication process sends the authentication request to the first local multi-authentication (LM) module, said providing further comprising:

receiving, by the first LM module, the authentication request comprising Q_ClientAddr, Q_App, and Q_UserID, wherein a first value Q_ClientAddr identifies the client system, wherein a second value Q_App identifies the service application, and wherein a third value Q_UserID identifies the user who attempts to log in to the Q_App service application from the Q_ClientAddr client system;

identifying at least one peer security enhanced user service system from a peer list stored in a secure authentication database (SDB), wherein the SDB is locally coupled to the first LM module, wherein the SDB comprises the peer list, at least one connection data, and at least one user profile;

propagating a respective query comprising Q_ClientAddr, Q_App, and Q_UserID, to a respective LM module of the identified at least one peer security enhanced user service system;

receiving a respective response from the respective LM module, wherein said respective response comprises a respective connection data as searched in each secure authentication database (SDB) locally couple to the respective LM module of said at least one peer security enhanced user service system;

determining that a logical condition UP_Condition associated with the authentication request is TRUE (1) as a result of evaluating the logical condition UP_Condition stored in the SDB by use of the values of the respective response from said at least one peer security enhanced user service system; and returning the grant response to the user authentication process that had sent the authentication request, wherein the user authentication process and the first LM module run on a same physical computer system.

16. The process of claim 15, wherein a k-th local multi-authentication (LM) module is selected from the respective LM module, said providing further comprising:

in response to said propagating, receiving the propagated query addressed to the k-th LM module;

searching a k-th secure authentication database (SDB) locally coupled to the k-th LM module for a k-th connection data matching the received propagated query; and responding to the received propagated query with the k-th connection data comprising C_ClientAddr, C_App, C_UserId, and C_Status, wherein a value of C_ClientAddr is identical to the first value Q_ClientAddr, wherein a value of C_App is identical to the second value Q_App, wherein a value of Q_UserId is identical to the third value Q_UserId, and wherein a value C_Status is selected from a group consisting TRUE (1) and FALSE (0), wherein TRUE represents that the user C_UserID is currently signed in with the service application C_App from the client system C_ClientAddr, and wherein FALSE represents that the user C_UserID is not signed in with the service application C_App from the client system C_ClientAddr.

* * * * *